Patented June 16, 1953

2,642,445

UNITED STATES PATENT OFFICE 2,642,445

HALOGEN ADDITION PRODUCTS OF 1,4-DIHYDROANTHRAQUINONE

Hans Z. Lecher, Plainfield, and Karl C. Whitehouse, Somerville, N. J., assignors to American Cyanamid Company, New York, N. Y., a corporation of Maine No Drawing. Application June 7, 1951,
Serial No. 230,426

8 Claims. (Cl. 260—384)

This invention relates to halogen addition products of 1,4-dihydroanthraquinone which may be represented by the formula

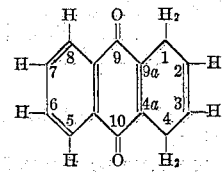

1,4-dihydroanthraquinone contains two non-aromatic double bonds, one between carbons 2 and 3, and the other between carbons $4a$ and $9a$. Ordinarily, where there are two or more double bonds in a ring of non-aromatic nature, addition of halogens will take place at both double bonds and the result is to produce either a tetrahalogen compound or to produce mixtures of isomeric dihalogen compounds. In the case of dihydroanthraquinone, however, the halogens suited for such addition reactions, i. e., halogens having an atomic weight more than 34, such as chlorine, bromine, and iodine, attach themselves only to the double bond between carbon atoms 2 and 3, producing a 2,3-dihalo-1,2,3,4-tetrahydroanthraquinone product having the formula

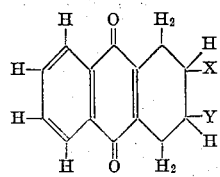

in which X and Y are halogens having an atomic weight above 34. It is not known why the halogens behave in this anomalous manner, and it is not intended to limit the invention to any theory of why the reaction takes place in this particular fashion, making it possible for the first time to produce pure 2,3-dihalo-1,2,3,4-tetrahydroanthraquinones.

The new compounds of the present invention are chemically well defined and stable and are useful intermediates for the production of various dyestuffs and other products.

The process by which the compounds of the present invention are made is simple and the reaction proceeds smoothly; no special technique need be learned to bring about the unusual behavior of halogen in the process. It is desirable, ordinarily, to disperse the 1,4-dihydroanthraquinone in an inert organic liquid which may be a solvent therefor. Under such circumstances the reaction proceeds more easily and smoothly and the presence of an inert organic liquid as the reaction medium, therefore, constitutes a preferred embodiment of the process feature of the present invention. Practically any organic inert liquid may be used, typical examples being carbon tetrachloride, tetrachloroethane, ethylene dichloride, chlorobenzene, chloroform, or nitrobenzene. The halogenating agent may be free halogen such as chlorine or bromine, or an interhalogen compound such as iodine chloride or iodine bromide. In the latter case a mixed halogen product is produced. The reaction is exothermic and it is desirable to provide adequate cooling and thorough agitation. Isolation of the halogen addition product can be effected by conventional means and presents, therefore, no problem in practice. This is an additional practical advantage of the present invention.

The present invention is further illustrated by the following examples, all parts being by weight.

Example 1

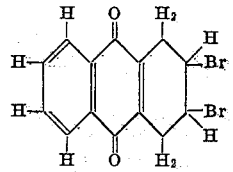

A solution of 9.6 parts of bromine in 40 parts of carbon tetrachloride is slowly added to an agitated slurry of 10.5 parts of 1,4-dihydroanthraquinone in 200 parts of carbon tetrachloride at a temperature of 0–5° C. The reaction mixture is allowed gradually to reach room temperature. The yellow product is filtered off, washed with carbon tetrachloride, and dried at 50° C. The yield is excellent.

Example 2

Similar results are obtained as in the previous example if the carbon tetrachloride is replaced by an equal weight of sym. tetrachloroethane. The product is somewhat more soluble in tetrachloroethane than in carbon tetrachloride.

Example 3

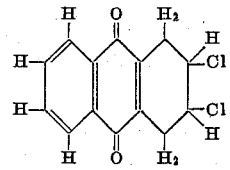

3.7 to 3.8 parts of chlorine are slowly passed into an agitated slurry of 10.5 parts of 1,4-dihydroanthraquinone in 240 parts of carbon tetrachloride at 15–20° C. The mixture is then stirred overnight at room temperature, and the yellow slurry filtered. The product is washed with carbon tetrachloride and dried at 55° C. A good yield is obtained. If desired, it can be recrystallized from glacial acetic acid or acetone. It melts at approximately 189° C.

*Example 4*

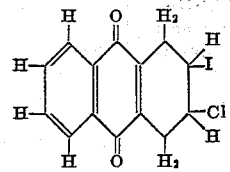

A solution of 8.6 parts of iodine chloride in 36 parts of ethylene dichloride is gradually added to an agitated slurry of 144 parts of ethylene dichloride and 10.5 parts of 1,4-dihydroanthraquinone at 20–25° C. The reaction is completed by stirring at 20–25° C. The product is filtered off, washed with ethylene dichloride, and dried. A good yield is obtained. The product does not melt, but decomposes around 120° C.

We claim:

1. A 2,3 - dihalo - 1,2,3,4 - tetrahydroanthraquinone of the formula

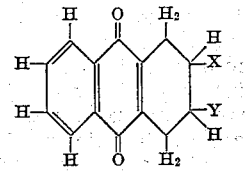

in which X and Y represent halogens of an atomic weight above 34.

2. 2,3 - dichloro-1,2,3,4-tetrahydroanthraquinone of the formula

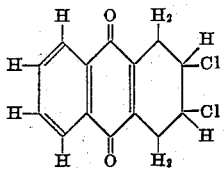

3. 2,3 - dibromo-1,2,3,4 - tetrahydroanthraquinone of the formula

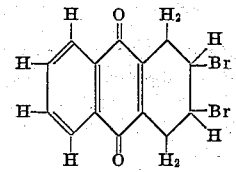

4. 2-iodo-3-chloro-1,2,3,4 - tetrahydroanthraquinone of the formula

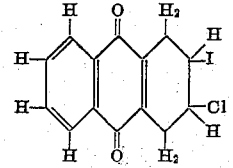

5. A process of producing a 2,3-dihalo-1,2,3,4-tetrahydroanthraquinone which comprises reacting a compound selected from the group of halogens of an atomic weight above 34, and interhalogen compounds thereof, with 1,4-dihydroanthraquinone in a reaction medium comprising an inert organic liquid.

6. A process according to claim 5 in which the halogen is chlorine.

7. A process according to claim 5 in which the halogen is bromine.

8. A process according to claim 5 in which the interhalogen compound is iodine chloride.

HANS Z. LECHER.
KARL C. WHITEHOUSE.

References Cited in the file of this patent

UNITED STATES PATENTS

| Number | Name | Date |
|---|---|---|
| 1,967,862 | Carothers | July 24, 1934 |

OTHER REFERENCES

Skita, Berichte, vol. 58, pp. 2693–2695.
Diels et al., Berichte, vol. 62, pp. 2337–2340, 2355–56.